Patented May 27, 1952

2,598,648

UNITED STATES PATENT OFFICE 2,598,648

PROCESS FOR THE PRODUCTION OF COMPOUNDS OF THE ANDROSTANE SERIES

Karl Miescher, Riehen, and Peter Wieland, Basel, Switzerland, assignors to Ciba Pharmaceutical Products, Inc., Summit, N. J.

No Drawing. Application June 26, 1950, Serial No. 170,461. In Switzerland July 15, 1949

7 Claims. (Cl. 260—397.4)

The present invention is concerned with the production of compounds of the androstane series by the oxidation of 3-hydroxy-20-keto-pregnanes by means of aromatic per-acids.

Insofar as 20-keto-pregnane compounds have heretofore been converted into the corresponding acyloxy compounds by means of per-acids, the effective starting compound—as far as the oxidation itself is concerned—has always been a 3-ester derivative. Thus, Sarett [Journal of the American Chemical Society, vol. 69, page 2899 (1947)] has described the action of perbenzoic acid in a neutral medium on 3-acetoxy-20-keto-pregnane. Moreover, while U. S. Patent No. 2,304,836 appears inter alia to be concerned with the oxidation of 3-hydroxy-20-keto-pregnane with persulfuric acid, the process is actually carried out in an acetic acid medium so that esterification of the hydroxyl group in the 3-position occurs during the reaction.

A primary object of the invention is the achievement of the oxidation of the 3-hydroxy-20-keto-pregnanes by means of aromatic per-acids in the absence of an organic esterifying agent, i. e. without the necessity of first converting the 3-OH group into an ester group.

This object is realized by the present invention, according to which a starting 3-hydroxy-20-keto-pregnane can be oxidized to a compound of the androstane series by subjecting the starting material, if necessary or desired with the temporary protection of double bonds which may be present, in the absence of an organic esterifying agent, to the action of an aromatic per-acid without the addition of an acid catalyst at a temperature below 15° C. or, alternatively, in the presence of an acid catalyst. The product so obtained may then be subjected to fractional separation and/or further oxidation.

The 3-hydroxy-20-keto-pregnane used as starting materials may contain further substituents, especially a free or substituted hydroxyl or keto-group in the 11-position.

The oxidation according to the present invention may also be applied to compounds which are unsaturated in the nucleus, such as $\Delta^{5,6}$- or $\Delta^{11,12}$-3-hydroxy-20-keto-pregnenes. When the starting material is unsaturated in the nucleus, it is of advantage to protect its carbon-to-carbon double bond before the reaction. This can be done in the conventional manner by the addition of halogen, hydrogen halide and especially bromine. After the oxidation the double bond so protected may be regenerated by splitting off halogen or hydrogen halide.

As aromatic per-acids, mono-perphthalic acid and perbenzoic acid are preferred. As acid catalysts there are used strong acids such as sulfuric acid, perchloric acid or para-toluene sulfonic acid. The reaction is conducted in an inert organic solvent, for example, in a halogenated hydrocarbon or in ether. It is of special advantage to use chloroform.

The reaction is preferably carried out at a temperature of about 0° C. When the oxidation is carried out without the addition of an acid, the temperature must not exceed about 15° C.

The general course of the reaction in accordance with the process of this invention is illustrated by the following formulae, in which pregnenolone is taken as a prototype:

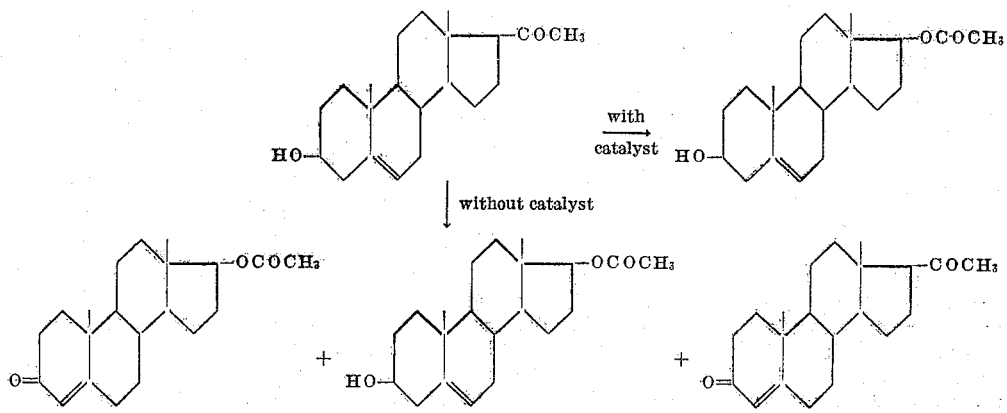

In the presence of an acid catalyst, the aromatic per-acid attacks only the —COCH₃ group in the 17-position. The hydroxyl group in the 3-position remains intact. Starting from a 3-hydroxy-20-keto-pregnane in this manner, a 17-mono-acetate-androstane-3,17-diol is obtained in a single reaction. When the starting material contains a double bond, there is obtained, with temporary protection of the double bond, the corresponding androstene. By starting from pregnenolone in accordance with the course of reaction shown above and with protection of the double bond, there is obtained by oxidation in the presence of an acid catalyst and regeneration of the double bond an excellent yield of Δ⁵,⁶-androstene-3,17-diol-17-monoacetate. The latter may be oxidized subsequently in known manner by means of a metal alcoholate or phenolate and a carbonyl compound (exchange of oxidation stages), chromium trioxide or a permanganate, etc., to 3-keto-Δ⁴,⁵-17-acetoxy-androstene (testosterone acetate).

If, on the other hand, a 3-hydroxy-20-keto-pregnane is subjected to the action of the per-acid without the addition of an acid catalyst, there is obtained a mixture of oxidation products. The hydroxyl group in the 3-position is mainly oxidized. At the same time, however, the —COCH₃ group in the 17-position is also converted into an acetoxy group. Thus, for example, as shown by the above formulae testosterone acetate can be obtained in one operation starting from 3-hydroxy-Δ⁵,⁶-20-keto-pregnene. If the 17-monoacetate of Δ⁵,⁶-androstene-3,17-diol formed simultaneously in approximately the same yield if after-oxidized, the yield of testosterone acetate can be almost doubled. The third oxidation product is progesterone.

In order to isolate in a pure state the individual components of the oxidation mixture obtained by the oxidation with per-acid without the addition of an acid catalyst, the procedure may be, for example, as follows. The ketonic and non-ketonic portions are separated from one another in known manner. There are obtained from the ketonic portion by hydrolysis, chromatography and crystallization, compounds of the type of testosterone and progesterone. The non-ketonic portion yields compounds corresponding to Δ⁵,⁶-androstene-3,17-diol-17-monoacetate.

The following examples further illustrate the invention, the parts and percentages being by weight unless otherwise stated and the relationship of parts by weight to parts by volume being the same as that of the gram to the cubic centimeter:

EXAMPLE 1

Δ⁵-androstene-3β,17β-diol-17-monoacetate of the formula

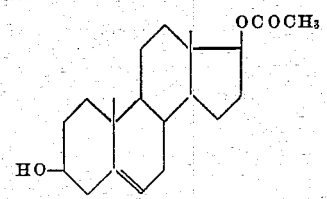

A solution of 0.63 part of pregnenolone in 3 parts by volume of chloroform is mixed while cooling with ice with 0.32 part of bromine, dissolved in 2 parts by volume of carbon tetrachloride. After the solution is decolorized, it is evaporated under reduced pressure at 15° C., and mixed with 8.2 parts by volume of chloroform containing 1.2 parts of mono-perphthalic acid and with 0.8 part by volume of a solution of 10 per cent strength of para-toluene sulfonic acid in chloroform. The reaction solution is allowed to stand in the dark at 0° C. for 4 weeks. The reaction mixture is then mixed with water and ether, the ethereal solution is washed with a solution of sodium bicarbonate and water, and evaporated to dryness. The product is then debrominated with 6 parts of zinc dust and 20 parts by volume of glacial acetic acid. In order to remove starting material, the reaction mixture is boiled with 1 part of Girard reagent P, 2.02 parts of glacial acetic acid and 20 parts by volume of methanol for 1 hour in a reflux apparatus.

The whole is then poured in to ice water containing 1.6 parts of sodium carbonate, and extracted with ether. The ethereal solution is then washed with water, dried and evaporated, and the residue is chromatographed over 20 parts of aluminum oxide. The fractions obtained with benzene are then recrystallized from a mixture of isopropyl ether and petroleum ether to yield Δ⁵-androstene-3β,17β-diol-17-monoacetate melting at 146–147° C. A further quantity of starting material can be recovered by working up the aqueous solution resulting from the treatment with Girard reagent P.

By oxidizing pregnane-3α-ol-11,20-dione of melting point 172–174° C. in analogous manner with monoperphthalic acid in the presence of para-toluene sulfonic acid and hydrolyzing the so formed product, etiocholane-3α,17β-diol-11-one of melting point 254–255° C. is formed.

EXAMPLE 2

*Testosterone*

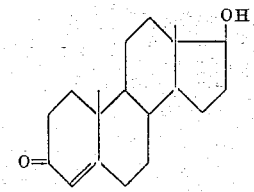

0.63 part of pregnenolone is oxidized in the manner described in Example 1 with 0.915 part of perbenzoic acid in 5.1 parts by volume of chloroform without the use of an added catalyst. The ketonic portions, which are obtained after separation with Girard reagent P, are hydrolyzed by dissolving them in 10 parts by volume of methanol and boiling the solution with a solution of 0.08 part of potassium carbonate in 1 part by volume of water and 5 parts by volume of methanol for 1 hour in a reflux apparatus. After diluting the hydrolysis solutions with ether, the ethereal solution is washed with dilute hydrochloric acid and water, dried and evaporated. The resulting oil is chromatographed over 20 parts of aluminum oxide. By means of benzene there are elutriated in succession progesterone, pregnenolone and testosterone. After recrystallization from a mixture of chloroform and isopropyl ether and sublimation under a high vacuum, the testosterone melts at 149–150° C. The non-ketonic portions, after being chromatographed over 6 parts of aluminum oxide, yield further Δ⁵ - androstene-3β-17β-diol-17-monoacetate.

Having thus disclosed the invention what is claimed is:

1. A process for the preparation of a compound of the androstane series, which comprises subjecting a member selected from the group consisting of nuclearly saturated 3-hydroxy-20-keto-pregnanes and nuclearly unsaturated 3-hydroxy-20-keto-pregnanes, the double bonds of which are temporarily protected, to the action of an aromatic per-acid selected from the group consisting of perbenzoic acid and monoperphthalic acid in the absence of an esterifying agent, and separating the resultant products.

2. A process according to claim 1, wherein the reaction is carried out at a temperature below about 15° C. and in the absence of an added catalyst, whereby the 3-hydroxy group of the starting compound is partly oxidized to a keto group.

3. A process according to claim 1, wherein the reaction is carried out in the presence of an added strong acid catalyst, whereby the 3-hydroxy group of the starting compound is not attacked.

4. A process for the preparation of a compound of the androstane series, which comprises subjecting a nuclearly unsaturated 3-hydroxy-20-keto-pregnane to the action of an aromatic per-acid, selected from the group consisting of perbenzoic acid and monoperphthalic acid in the absence of an esterifying agent and with temporary protection of the double bonds present in the said starting compound, the reaction being carried out at a temperature below about 15° C. and in the absence of an added catalyst, and separating the resultant products.

5. A process for the preparation of a compound of the androstane series, which comprises subjecting a nuclearly unsaturated 3-hydroxy-20-keto-pregnane to the action of an aromatic per-acid, selected from the group consisting of perbenzoic acid and monoperphthalic acid in the absence of an esterifying agent and with temporary protection of the double bonds present in the said starting compound, the reaction being carried out in the presence of an added strong acid catalyst, and separating the resultant products.

6. A process for the preparation of a compound of the androstane series, which comprises subjecting $\Delta^{5,6}$-3-hydroxy-20-keto-pregnane to the action of an aromatic per-acid, selected from the group consisting of perbenzoic acid and monoperphthalic acid in the absence of an esterifying agent and with temporary protection of the double bond present in the said starting compound, the reaction being carried out at a temperature below about 15° C. and in the absence of an added catalyst, and separating the resultant products.

7. A process for the preparation of a compound of the androstane series, which comprises subjecting $\Delta^{5,6}$-3-hydroxy-20-keto-pregnane to the action of an aromatic per-acid, selected from the group consisting of perbenzoic acid and monoperphthalic acid in the absence of an esterifying agent and with temporary protection of the double bond present in the said starting compound, the reaction being carried out in the presence of an added strong acid catalyst, and separating the resultant products.

KARL MIESCHER.
PETER WIELAND.

REFERENCES CITED

The following references are of record in the file of this patent:

UNITED STATES PATENTS

| Number | Name | Date |
|---|---|---|
| 2,304,836 | Marker | Dec. 15, 1942 |

OTHER REFERENCES

Sarett, Journal Am. Chem. Soc. 69, 2899–29901 (1947).